United States Patent [19]

McKelvie et al.

[11] 4,322,162
[45] Mar. 30, 1982

[54] METHOD AND APPARATUS FOR SENSING IN-PLANE DEFORMATION OF A SURFACE

[75] Inventors: James McKelvie; Colin A. Walker, both of Glasgow, Scotland

[73] Assignee: National Research Development Corporation, London, England

[21] Appl. No.: 127,212

[22] PCT Filed: Nov. 24, 1978

[86] PCT No.: PCT/GB78/00043
§ 371 Date: Jul. 25, 1979
§ 102(e) Date: Jul. 23, 1979

[87] PCT Pub. No.: WO79/00320
PCT Pub. Date: Jun. 14, 1979

[51] Int. Cl.³ .................................................. G01L 1/24
[52] U.S. Cl. ...................................................... 356/35.5
[58] Field of Search ................. 356/35.5, 355, 356, 356/349

[56] References Cited

U.S. PATENT DOCUMENTS

| | | | |
|---|---|---|---|
| 3,709,610 | 1/1973 | Kruegle | 356/355 |
| 3,726,595 | 4/1973 | Matsumoto | 356/356 |
| 3,822,942 | 7/1974 | Hock | |
| 3,976,381 | 8/1976 | Walker | 356/35.5 |
| 3,985,444 | 10/1976 | Takashima | 356/35.5 |
| 4,030,831 | 6/1977 | Gowrinathan | 356/349 |

FOREIGN PATENT DOCUMENTS 1364607  8/1974  United Kingdom .
1454340 11/1976  United Kingdom .

OTHER PUBLICATIONS

Journal of Physics & Scientific Instruments, 1972, vol. 5, pp. 833-845.
Instruments and Control Systems, Dec. 1971, pp. 64-66.
Laser Range Instrumentation, (Society of Photo-Optical Instrumentation Engineers), Oct. 1967, pp. i & 93-98.

Primary Examiner—John K. Corbin
Assistant Examiner—Bruce Y. Arnold
Attorney, Agent, or Firm—Cushman, Darby & Cushman

[57] ABSTRACT

A surface on which there is a regular periodic pattern, often a relief pattern (12), is deformed, and in-plane deformation is sensed by illuminating the deformed pattern with a beam (12) of coherent light so that light is reflected as one zero order beam and a plurality of diffracted beams; two of the beams (16,18) are combined so that they interfere in a manner related to the deformation along the direction of intersection of the surface plane with the plane in which the two interfering beams lie. The magnitude and direction of in-plane deformation in one or more directions, and the magnitude and direction of the maximum in-plane stress or strain, can be determined automatically.

37 Claims, 15 Drawing Figures

METHOD AND APPARATUS FOR SENSING IN-PLANE DEFORMATION OF A SURFACE

This invention relates to a method and apparatus for sensing in-plane deformation of a surface.

It is known to sense the in-plane deformation of a surface by applying a regular relief pattern to the surface, deforming the surface, recording the deformed relief pattern by forming a cast, and examining the cast by two incident beams of light. This is described in the specification of UK Pat. No. 1,454,340, University of Strathclyde. However, the casting step may in some circumstances be inconvenient.

In the specification of UK Pat. No. 1,364,607, Canon Kabushiki Kaisha, a photographic record of a deformed periodic pattern on a surface is illuminated by two beams of light, and two beams diffracted by the record are combined. Such an arrangement allows photographic recording of contours of in-plane deformation in one dimension, but does not allow instantaneous analysis.

According to the invention, a method of sensing in-plane deformation of a surface on which there is a regular periodic pattern comprises deforming the surface so as to deform the pattern; illuminating the deformed pattern with a beam of coherent electromagnetic radiation so that the radiation is reflected as one zero order beam and a plurality of diffracted beams; and combining two of said beams, whereby the beams interfere in a manner related to the deformation along the direction of the intersection of said plane of the surface with the plane in which the two interfering beams lie.

Conveniently and for geometrical simplicity, the illuminating beam is collimated and is incident normally on the grating and two beams of the same diffracted order number and of opposite sign are combined. Alternatively, the zero order beam can be combined with a diffracted beam, or two beams each in a different diffracted order may be combined.

The regular periodic patterns may be intrinsic to the surface, or may be a grating, preferably a phase grating such as a relief grating, attached to the surface, for example by a suitable adhesive, or formed in a material which itself adheres to the surface.

Preferably the relief pattern is such that all of the incident energy is diffracted into only a small number of diffracted orders. Such a relief pattern may have a substantially sinusoidal transverse section and may be of pitch of between about $10^{-1}$ and about $10^{-3}$ millimeters. The illuminating wavelength is not limited by the grating pitch, and for convenience visible light may be used.

If the deformation in a single in-plane direction is to be sensed, then the relief pattern may be periodic in that direction only. However, measurement of strain in a single direction is not always adequate, and the direction of strain is not always predictable.

Further according to the invention, a method in which the pattern is periodic in two in-plane dimensions and at least three beams are combined as at least two pairs, one beam intersecting the plane defined by two other beams. Usually the pattern will be periodic in two orthogonal directions. For convenience and simplicity two pairs of beams may be combined, each pair lying in one of two planes relatively at right angles, or at another known angle, and both planes intersecting the deformed surface, preferably at right angles. Alternatively, there may be three pairs of beams each pair lying in a plane with two planes lying relatively at right angles and the third plane lying at a substantial angle, often 45°, to each of the other planes, all three planes intersecting the deformed surface, preferably but not necessarily at right angles.

It is an advantage of any arrangement which provides at least two combined beams that a full analysis of the in-plane strain including shear can be made with relative ease, although use of six beams combined as three beam pairs is the conceptually most simple arrangement.

Also according to the invention, apparatus for sensing in-plane deformation of a surface on which there is a regular periodic pattern comprises means for illuminating the periodic pattern with a beam of coherent electromagnetic radiation; and receiving and combining means for receiving from the pattern at least two of a zero order beam and a plurality of diffracted beams, and for combining as at least one pair of said at least two beams whereby the combined beams interfere. Usually the illuminating means will comprise a laser.

The combined pair of diffracted beams or each beam, may be viewed by an observer for a qualitative assessment, or may be recorded, e.g. photographically, for subsequent quantitative assessment. However, it is an advantage of the present invention that a measurement of strain can be made automatically and almost instantaneously.

Also according to the invention, strain-sensing apparatus comprising receiving and combining means for receiving from a deformed periodic pattern illuminated by a beam of coherent electromagnetic radiation at least two of a zero order beam and a plurality of diffracted beams and for combining as at least one pair said at least two beams whereby the combined beams interfere; and sensing means to sense the average wavelength, due to the interference, of the spatial intensity variation transverse to the combined beam.

The means to sense the average wavelength may comprise a linear array of photosensitive devices arranged transverse to each combined-pair beam, in the plane defined by the pair of beams before combination, the devices being small in comparison with the beam diameter. The array may be an array of photodiodes or charge-coupled devices plus scanning means to repeatedly scan the array and provide an output signal depending on the intensity of the radiation on each diode or device. Alternatively, the sensing means may be a vidicon device.

In another arrangement there is provided phase-modulation means arranged to cause a continuously varying phase relationship between the two beams in each combined pair, whereby a moving interference pattern is produced; and two photosensitive devices arranged to receive the pattern, the devices being spaced apart by a distance which is small compared with the spatial wavelength of the interference pattern and in a direction such that the devices are separated to some extent in the plane in which the two combined beams lie; and phase comparator means to sense the difference in phase of the output signals from the two photosensitive devices.

The invention will now be described by way of example with reference to the accompanying drawings in which.

Figure 1:
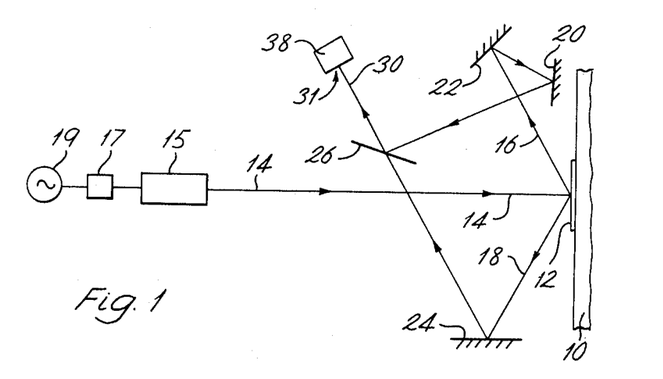
FIG. 1 shows schematically apparatus for sensing strain in one dimension.
Figure 2A:
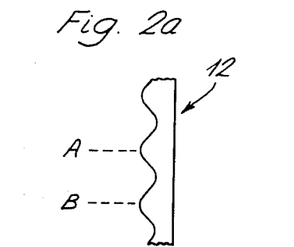
FIG. 2(a) is a section through part of a relief pattern grating suitable for use in the apparatus of FIG. 1.
Figure 2B:
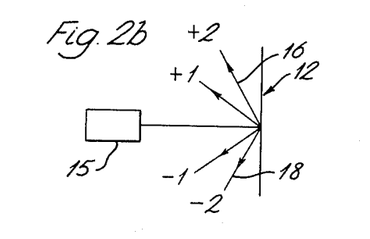
FIG. 2(b) shows the diffracted beams when such a grating is illuminated normally.
Figure 2C:
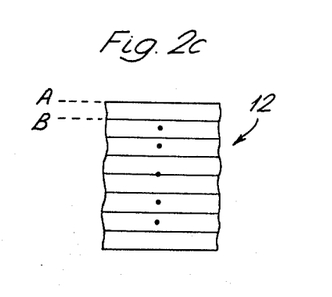
FIG. 2(c) shows the position of the diffracted orders.

In FIG. 1, an object which is to be strained is represented by reference 10 and a relief grating 12 is attached to the surface of the object by a suitable adhesive. The grating 12 is illuminated by a normally-incident collimated beam of light 14 a few millimeters in diameter produced by a laser 15 having a power supply 17 and power source 19. For example a 2 milliwatt Hughes laser can be used. The grating 12 has a regular periodic structure in one dimension as shown in FIG. 2(a), with a sinusoidally varying surface of pitch AB of about 1 or $2 \times 10^{-3}$ millimeters. The grating lines formed by the surface variations are therefore perpendicular to the plane of FIG. 1; as shown in FIG. 2(b) the incident light will be diffracted into only a few orders each of high intensity. As shown in FIG. 2(c), the diffracted orders can be viewed as a line of dots of light parallel to the grating plane and perpendicular to the grating lines. Referring again to FIG. 1, suppose the second order diffracted beams of opposite sign 16, 18 are reflected by means of plane mirrors 20, 22 and 24 and a beam combiner 26 to form a combined beam 30. If the grating 12 is unstrained, the light in the combined beam 30 will be spatially constant, provided the mirrors are correctly aligned. If, however, the grating is strained in the plane of the Figure and perpendicular to the incident beam from laser 14 by deforming the object 10, the combined beam will contain an interference pattern related to strain in that direction.

Figure 3:
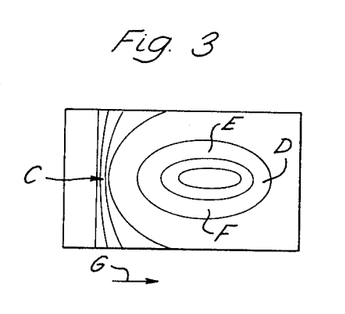
FIG. 3 illustrates a set of Moiré fringes.

Consider the conventional Moiré pattern illustrated in FIG. 3. The smaller the separation in the pattern, the greater the strain, synonymously with contours on a map; each contour represents unit displacement, thus strain in region C is greater than in region D. In the present invention, the arrangement in FIG. 1 senses strain only in one dimension, such as the direction shown by arrow G, and represents the component in that direction of a complex strain. The pattern in the combined beam 30, although not a Moiré pattern, has some of the properties of a set of Moiré fringes. It can be displayed on a screen and viewed by eye, or recorded directly by photography, and the magnitude of the strain can be calculated.

Usually, a measure of the component of strain in one in-plane direction will be insufficient, and it will be necessary to duplicate or triplicate the mirrors and beam combiner in FIG. 1 in order to sense strain in two or three directions in the plane of the surface. If measurements are made in two in-plane directions, they will usually be orthogonal but may be at another known relative angle. However, the most convenient arrangement is to have three systems each measuring strain in a different direction, and one possible arrangement is shown schematically in FIG. 4(a).

Figures 4A, 4B, 5:
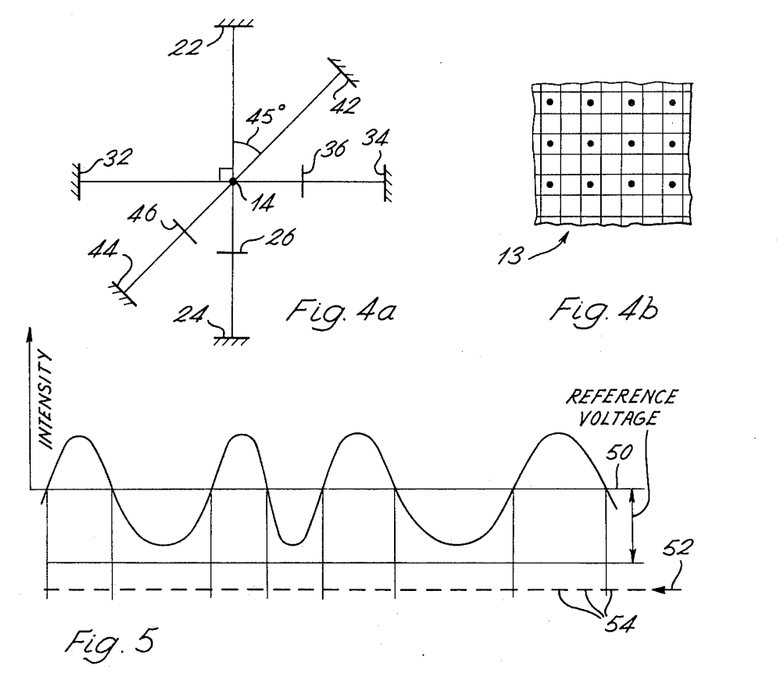
FIG. 4(a) shows schematically apparatus for sensing strain in three different coplanar directions.
FIG. 4(b) shows a relief grating for such an apparatus and the relative position of the diffracted orders.
FIG. 5 shows a typical interference fringe waveform viewed by an array of photodiodes.

FIG. 4(a) illustrates a view equivalent to that along the laser beam 14 towards the grating (not shown) and shows the mirrors 22, 24 and beam combiner 26 arranged as in FIG. 1. Two other similarly arranged sets of mirrors 32, 34 and 42, 44 each have an associated beam combined 36, 46 as shown; each optical system can sense strain in a different direction in the plane of the relief grating. For convenience two directions are orthogonal and the third makes an angle of 45° with the other two, although other relative angles can be used, provided they are substantial, e.g. more than 20°.

It is now necessary to provide a relief grating having a periodic structure in two dimensions, again preferably of sinusoidal shape. In FIG. 4(b), which is the two-dimensional equivalent of FIG. 2(c), the lines on grating 13 are seen to form a grid structure with the diffracted beams visible as a two-dimensional array of dots.

Referring again to FIG. 4(a), the combined beams from each optical system are in different directions, and can be received on a screen or recorded photographically e.g. at position 31 in FIG. 1 and at the other two corresponding positions. Each combined beam is in a different direction and contains information related to a strain along one in-plane direction so that calculation of the value of strain in each in-plane direction can be made simply and easily from each interference pattern with no problems of superimposition of information from different strain directions. Measurements can be made simultaneously in two or more directions. However, there is still the problem that, for an overall picture, the information on the measured strains must be combined if maximum strain and its direction are required. This may involve considerable mathematical computation.

It is a great advantage of a method and apparatus according to the invention that an entirely automatic analysis system can be provided to carry out these calculations in real time. In FIG. 1 instead of an observer's eye or a photographic camera being placed at position 31, an electronic scanning system 38 may be used; the system may be an array of photodiodes or charge-coupled devices plus a scanning arrangement, or may be a vidicon or similar device. One scanned system is provided for each of the three optical systems in FIG. 4, although for clarity they are not illustrated in that Figure.

Figure 6:
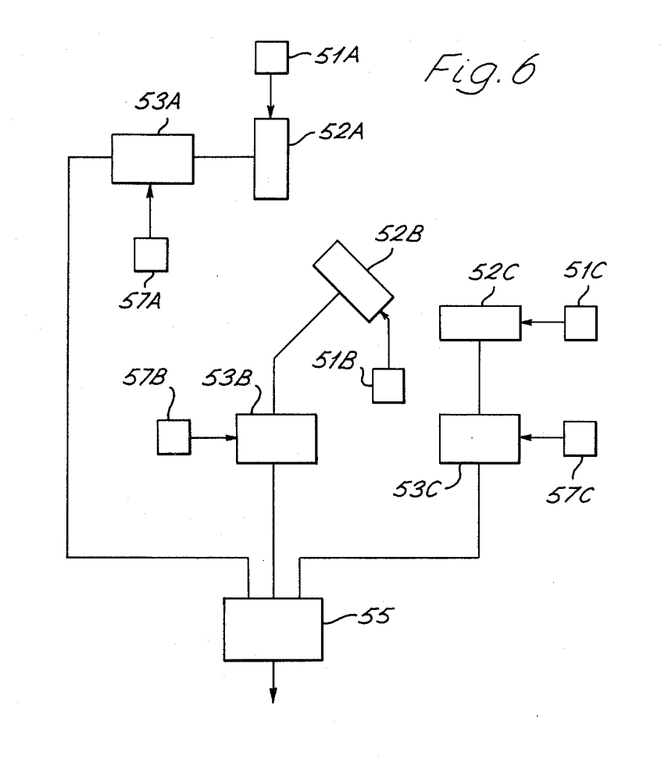
FIG. 6 illustrates schematically a circuit for calculating strain in three in-plane directions.

Suppose the spatial variation about a base line 50 of the light intensity of the interference pattern in one combined beam is as shown in FIG. 5, and that this light pattern is incident on a linear array 52 of photodiodes 54. There may be 256 diodes in the array, and the voltage on each photodiode will depend on the incident light intensity. By sequential comparison of the voltage on each photodiode with a reference voltage by means of a voltage comparator, an output signal can be provided each time the base line 50 is crossed. By counting the number of photodiodes between each output signal, an average wavelength of the intensity variation in the light pattern can be calculated. A suitable apparatus is shown in FIG. 6 in which three photodiode arrays 52A, 52B, 52C, one for each measurement direction, are each connected to a respective scanning device 51A, B, C and the output signals supplied to one of three voltage comparators 53A, B, C, each of which supplies an output signal to an 8-bit microprocessor 55. Each comparator is supplied with a reference voltage from a unit 57A, B, C.

The microprocessor can be programmed to calculate from the three input signals the maximum principal in-plane strain averaged over the field of view on the relief grating, the maximum shear strain, and the angle of the principal strain. The result is obtained almost instantaneously and can be in numerical form. Use by operators unskilled in the interpretation of interference fringes is therefore possible. Alternatively, if the strains are in the elastic domain, stresses rather than strains can be calculated by providing values of the Young's modulus and Poisson's ratio for the material which is being deformed.

In practice, it has been found that the waveform is not the smooth sinusoid shown in FIG. 5 (whether of varying or invariant wavelength) but shows small-scale irregularities in its curvature; these may be caused, for example, by dirt in the optical system. A working device may operate in many adverse industrial environments so that cleanliness is impossible, and a correction must be applied. The microprocessor is operated so that from the output signals corresponding to each measuring direction an average wavelength is calculated, and the standard deviation of the distribution. Readings greater than one standard deviation from the average are discarded and the average wavelength is recalculated. It has been found that this conventional statistical technique gives an accurate measurement of fringe spacing.

Figure 7:
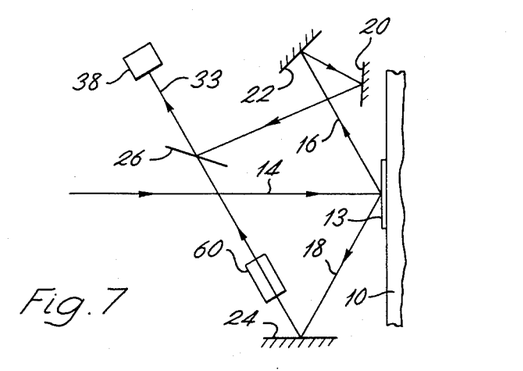
FIG. 7 illustrates the use of a phase modulator in one diffracted beam.

However, noise from whatever source may still be a problem and an alternative technique may be used. Referring now to FIG. 7, which is equivalent to FIG. 1 and in which identical items of apparatus are given the same reference numerals but using a two-dimensional relief grating 13, a phase modulator 60 is placed in the optical path of beam 18. The phase modulator is arranged to apply a continuous phase modulation to the beam 18 in a manner such as to change its wavelength. The effect may be achieved using an electrooptic device, or a piezoelectric crystal, driven by a sawtooth waveform; or an acousto-optic device; or a moving diffraction grating; the change in wavelength will then be continual rather than strictly continuous.

Figure 8:
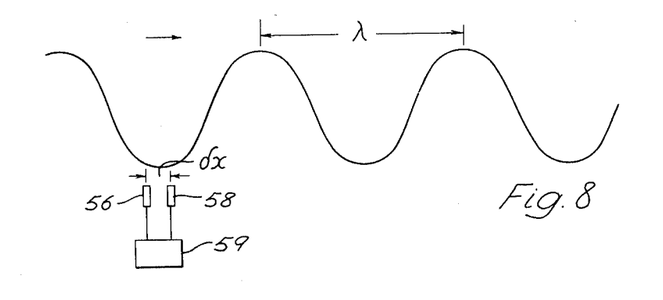
FIG. 8 illustrates the effect of phase modulation.

The effect of the change of wavelength in one component of the combined beam 33 is that the previously stationary interference pattern now moves transversely to the beam, as indicated by the arrow in FIG. 8. However, the background noise remains stationary. The moving pattern can be viewed by two photodiodes 56, 58 separated by a distance $\delta x$ which is small with respect to the wavelength $\lambda$ of the fringe pattern. Knowing $\delta x$, a measurement by phase comparator 59 of the phase difference between the outputs of the two photodiodes 56, 58 allows a calculation of the average wavelength $\lambda$ of the pattern, which is unaffected by background noise. The two photodiodes replace the diode array 52 in FIGS. 5 and 6 and this arrangement is alternative to use of a diode array plus calculation of standard deviation.

In this arrangement, one phase modulator and one phase comparator must be supplied in each of the three optical systems shown in FIG. 4, and the outputs from the two photodiodes associated with each system are connected to the respective comparator.

Figure 9:
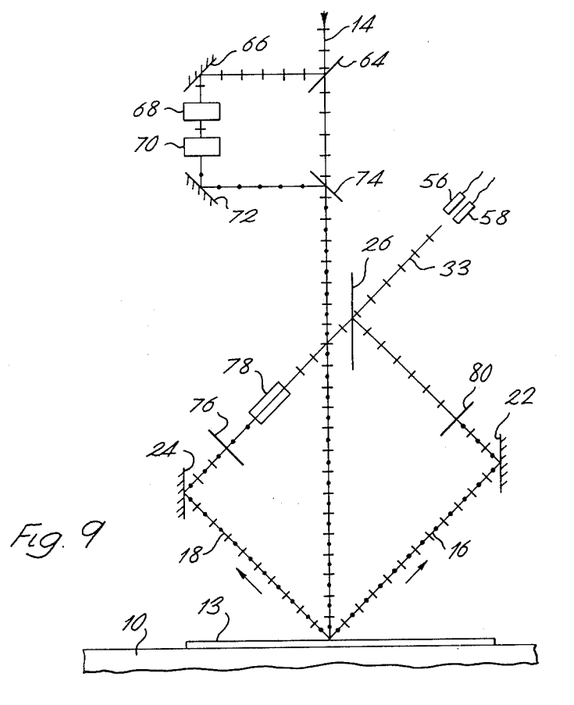
FIG. 9 illustrates use of one phase modulator in the input beam of a polarized optical system.

An alternative arrangement avoids the need for two or three phase modulators which may be bulky and/or expensive, and is shown in FIG. 9. Only one phase modulator is used in conjunction with a polarised optical system. The general arrangement is similar to that in FIGS. 1 and 7, although one mirror is omitted for simplicity.

The laser beam 14, having a first plane of polarisation indicated by the bars on the axial path, is incident on a beam splitter 64, which reflects part of the beam, via a plane mirror 66, to a phase modulator 68.

The modulated beam passes through a polarisation rotator 70 which rotates the plane of polarisation of the beam through 90° to a second plane of polarisation indicated by the dots on the axial path. The modulated and rotated beam is reflected by a plane mirror 72 to a beam combiner 74 which combines it with the part of the incident beam which passes through beam splitter 64. The beam from the combiner 74 is reflected from the relief grating 12 into two second order diffracted beams 16 and 18, which both contain components at two orthogonal planes of polarisation, one component being modulated. The beam 18 is reflected from plane mirror 24 through a polariser 76 which allows passage of radiation only in the second plane of polarisation, i.e. the phase-modulated beam; the polarised radiation then passes through a polarisation rotator 78 which causes rotation through 90° into the first plane of polarisation. The beam 16 is reflected by mirror 22 through a polariser 80 which allows passage of radiation only in the first plane of polarisation, i.e. which prevents passage of the modulated beam component. The two transmitted beams are combined by beam combiner 26 and are sensed by two closely-spaced photodiodes 56, 58 as before. The combined beam is linearly polarised in the first plane of polarisation but contains both phase-modulated and unmodulated components from beams 18 and 16 respectively, so that a moving fringe system is provided as in the FIG. 7 one-dimensional arrangement. By supplying second and third sets of optical components equivalent to mirrors 22, 24, polarisers 76, 80, rotator 78 and beam combiner 26, patterns relating to second and third sensing directions can be provided, but use of the polarisers and polarisation rotators allows the provision of only one phase modulator.

Several alternatives are available in the apparatus according to the invention. For example, instead of using a coarse relief grating and higher diffracted orders as shown in FIG. 1, a high frequency grating and beam pairs from lower diffracted orders can be used. It has already been stated that analysis using one or two directions is possible, although a three-direction in-plane analysis system is most widely applicable.

Throughout the description of the invention it has been assumed that the undeformed regular periodic grating is perfect. This will not usually be the case in practice, but in most cases grating imperfections will significantly affect the measurement of strain in the deformed grating only when the measured value is less than about 10 microstrains i.e. grating imperfections are normally less than 10 microstrain. It is the usual practice to check for grating imperfections by viewing at least one combined beam pair before deforming the grating; when an automatic fringe-counting system is used, this initial measurement may be used to correct the measurement made on the deformed grating if great accuracy is required.

When an automatic fringe-counting system is used, a typical beam diameter is a few millimeters, and the strain measured is averaged over the field of view (the photodiodes usually view an area smaller than the beam diameter). For use without an automatic readout, the beam diameter may be about 50 millimeters, and strain variations within the field of view can be observed.

It is an advantage of the arrangements using the larger beam area that buckling of the grating out of the plane of measurement is only a second order effect. When an automatic system is used, the effect is still small, but can be compensated by measuring the position of the zero diffraction order, and applying the appropriate correction to the measured values.

Figure 10A:
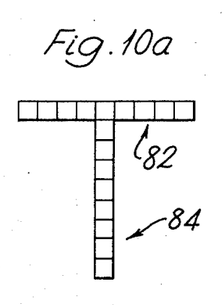
FIGS. 10(a) and 10(b) show two possible arrangements of linear detector arrays.
Figure 10B:
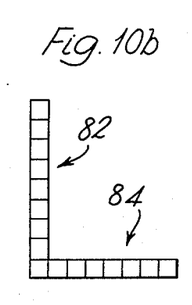

A further modification involves the use of two beam pairs whose generating beams lie in planes which intersect at a substantial angle. Usually they will intersect at right angles. A two-dimensional array of photosensitive devices may be used to sense the spatial variations of the interference fringes both parallel to the plane of two uncombined beams, and perpendicular to it. FIGS. 10(a) and 10(b) show suitable detector arrays 82, 84 arranged to form a T shape or an L shape. A cross shape may also be used. One such array is used in each combined beam, and the in-plane strain may be calculated from the four measurements. It is an advantage of this that the optical system is less complex.

Figure 10C:
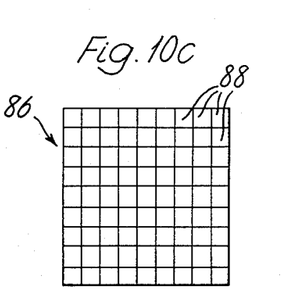
FIG. 10(c) shows a two dimensional matrix of photodetectors.

Yet another modification involving use of a large field of view may be made even with an automatic measuring system. A two-dimensional photosensitive device or a matrix 86 of discrete photosensitive devices 88 as shown in FIG. 10(c) may be used to sense the spatial variation transverse to the combined beams, and at a number of points in the field of view. For example, the interference fringe spacings may be measured by selecting pairs of photosensitive devices and measuring the phase difference between the signal outputs, due to the interference fringes sweeping across. By selecting pairs of photosensitive devices, which are arrayed along lines parallel to and perpendicular to the plane of the uncombined beams, the fringe spacings in these two directions can be gauged at a plurality of points in the field of view. From two such combined beam fringe pattern analyses, a complete strain contour pattern for the field of view can be constructed with suitable computation.

The illuminating beam in this modification may be 10–100 mm diameter.

It is a great advantage of the method and apparatus according to the invention that the relief grating and viewing system need not be mounted rigidly with respect to each other. Vibrations out of the plane of the relief grating, and linear in-plane vibration, have only second-order effects on the interference fringes. In-plane rotation affects both components of each combined beam. Even if the fringes are not continuously visible, the trends of a changing situation can be followed.

However, in any arrangement according to the invention, it is essential to keep the items of optical apparatus accurately in alignment, otherwise there is a risk that mechanical vibration of the system will prevent the formation or reception of one or more combined beams. It will often be necessary to use a conventional servo mechanism to stabilise the system and maintain the required alignment.

While the invention has been described with reference to relief gratings, which have been found to be efficient in this use, other regular periodic gratings may be used, for example an intensity-modulated grating or a bleached thick hologram having a reflecting back surface.

The invention has been described with reference to a system which does not incorporate any lenses. If a very small field of view is required, for example when spatial resolution is important, a magnifying system can be provided to magnify the beam incident on the detector system.

In the described arrangement, two diffracted beams in the same order but of opposite sign are caused to interfere; this is advantageous because the interfering beams will be of the same intensity; further, sensitivity is related to the angle between the diffracted beams, so a symmetrical system gives highest sensitivity. However, if maximum sensitivity is not important, the zero order beam can be combined with one or two or three diffracted beams. This minimizes the physical size of the apparatus by halving the angle between the received diffracted beams, so that use in a restricted position, such as in a corner, may be facilitated, but there is the disadvantage that at least one additional beam splitter is required.

In the illustrations, the required beams are combined after reflection from small mirrors. This assumes that the general proportions of the apparatus are such that each mirror receives only one beam, either because the incident beam is narrow, or because the distance of the mirrors from the surface is sufficient for the diffracted beams in a wide-beam system to be separated. A possible method of separating overlapping diffracted orders is to position a lens and an aperture stop between the beam combiner (reference 26 in FIG. 1) and the detecting system.

We claim:

1. A method of sensing in-plane deformation of a surface on which there is a regular periodic pattern and which is deformed when the surface is deformed comprising illuminating the deformed pattern with a single, normally incident beam of coherent electromagnetic radiation so that the radiation is reflected as one zero order beam and a plurality of diffracted beams; and combining two of said beams, whereby the beams interfere in a manner related to the deformation along the direction of the intersection of said plane of the surface with the plane in which the two interfering beams lie.

2. A method according to claim 1 in which the regular periodic pattern is a relief pattern.

3. A method according to claim 1, in which two beams of the same diffracted order number and of opposite sign are combined.

4. A method according to claim 1, in which the zero order beam is combined with a diffracted beam.

5. A method according to claim 1, in which the pattern is periodic in two in-plane dimensions, and at least three beams are combined as at least two pairs, one beam intersecting the plane in which two other beams lie.

6. A method according to claim 5 in which the pattern is periodic in two orthogonal directions, and two pairs of beams are combined, each pair of beams lying in one of two orthogonal planes.

7. A method according to claim 5 in which the pattern is periodic in two orthogonal directions, and three pairs of beams are combined, each pair defining a plane, with two of the planes being orthogonal and the third plane lying at 45° to each of the orthogonal planes, all three planes intersecting the deformed surface at right angles.

8. Apparatus for sensing in-plane deformation of a surface on which there is a regular periodic pattern comprising:
   means for illuminating the pattern with a beam of coherent electromagnetic radiation; and
   receiving and combining means (20, 22, 24, 26) for receiving from the pattern at least two of a zero order beam and a plurality of diffracted beams, and for combining as at least one pair said at least two beams whereby the combined beams interfere.

9. Apparatus according to claim 8 having means (20, 22, 24, 26) for receiving and combining two beams of the same diffracted order number and of opposite sign.

10. Apparatus according to claim 8 having means for receiving and combining the zero order beam and a diffracted beam.

11. Apparatus according to claim 8 having means (22, 24, 26, 32, 34, 36) for receiving and combining at least three beams to form two pairs, one beam intersecting the plane in which the other two beams lie.

12. Apparatus according to claim 8 having means (22, 24, 26, 32, 34, 36) for receiving and combining four beams as two pairs; each pair of beams lying in one of two orthogonal planes.

13. Apparatus according to claim 8 having means (22, 24, 26, 32, 34, 36, 42, 44, 46) for receiving and combining three pairs of beams, each pair lying in a plane with two of the planes being orthogonal and the third plane lying at 45° to each of the orthogonal planes, all three planes intersecting the deformed surface at right angles.

14. A strain measuring apparatus comprising:
   means for illuminating a deformed periodic pattern by a single, normally incident beam of coherent electromagnetic radiation;
   receiving and combining means (20, 22, 24, 26) for receiving from said deformed periodic pattern at least two of a zero order beam and a plurality of diffracted beams and for combining as at least one pair said at least two beams whereby the combined beams interfere; and
   sensing means (38) to sense the average wavelength of the spatial variation transverse to the combined beam of the interference pattern in the combined beam.

15. Strain measuring apparatus according to claim 14 in which the sensing means includes a linear array (52) of photosensitive devices (54) arranged transverse to the combined-pair beam and in the plane defined by the pair of beams before combination.

16. Strain measuring apparatus according to claim 14 in which the average wavelengths of the spatial variation of the interference patterns in two combined beams are each sensed by two linear arrays (82, 84) of photosensitive devices arranged transverse to each combined beam and at right angles to each other.

17. Strain measuring apparatus according to claim 14 in which the sensing means includes a two-dimensional photosensitive device (86) arranged transverse to the combined-pair beam.

18. Strain measuring apparatus according to claim 14 comprising phase-modulation means (60) arranged to cause a continuously varying phase relationship between the two beams in a combined pair whereby a moving interference pattern is produced; two photosensitive devices (56, 58) arranged to receive the pattern, the devices being spaced apart by a distance which is small compared with the spatial wavelength of the interference pattern and in a direction such that the devices are separated in the plane in which the two combined beams lie; and phase comparator means (59) to sense the difference in phase of the output signals from the two photosensitive devices.

19. Strain measuring apparatus according to claim 18 in which the illuminating means further comprises polarising and modulating means (68, 70) arranged to provide an illuminating beam consisting of radiation at two orthogonal directions of polarisation, radiation polarised in one direction being modulated and radiation polarised in the other direction being unmodulated; and the receiving and combining means further comprises polarising means (76, 78, 80) arranged so that the modulated component of one received beam and the unmodulated component of the other received beam are combined as a beam pair.

20. Strain measuring apparatus according to claim 19 comprising three receiving and combining systems, each including a polarising means arranged so that in each of three beam pairs a modulated component of one received beam is combined with an unmodulated component of the other received beam.

21. A strain measuring system for measuring in-plane deformation of a surface on which there is a regular pattern which is periodic in two in-plane directions comprising:
   means for illuminating said pattern by a single, normally incident beam of coherent electromagnetic radiation;
   receiving and combining means (20, 22, 24, 26) for receiving from the pattern at least three of a zero order beam and a plurality of diffracted beams, one beam intersecting the plane in which the other two beams lie, and for combining as at least two pairs said at least three beams whereby the combined beams interfere;
   sensing means (52A, B, C) to sense the average wavelength of the spatial variation of the interference pattern in each combined beam; and
   calculating means (55) to calculate from the sensed average wavelengths at least one of the maximum principal in-plane stress or strain, the angle of the principal stress or strain, and the maximum shear stress or strain.

22. A method of sensing in-plane deformation of a surface on which there is a regular periodic pattern and which is deformed when the surface is deformed comprising, without making a record of the deformed pattern, illuminating the deformed pattern with a single beam of coherent electromagnetic radiation so that the radiation is reflected as one zero order beam and a plurality of diffracted beams; and combining two of said beams, whereby the beams interfere in a manner related to the deformation along the direction of the intersection of said plane of the surface with the plane in which the two interfering beams lie.

23. A method as in claim 22 in which the regular periodic pattern is a relief pattern.

24. Apparatus for sensing in-plane deformation of a surface on which there is a regular periodic pattern, comprising:
   means for illuminating the pattern itself (and not a record thereof) with a single beam of coherent electromagnetic radiation; and receiving and combining means for receiving from the pattern at least two of a zero order beam and a plurality of diffracted beams, and for combining as at least one pair said at least two beams whereby the combined beams interfere.

25. A strain measuring apparatus comprising:
means for illuminating a deformed periodic pattern by a single beam of coherent illumination;
receiving and combining means for receiving from said deformed periodic pattern itself (and not a record thereof) at least two of a zero order beam and a plurality of diffracted beams and for combining as at least one pair said at least two beams whereby the combined beams interfere; and
sensing means to sense the average wavelength of the spatial variation, transverse to the combined beam, of the interference pattern in the combined beam.

26. A strain measuring system for measuring in-plane deformation of a surface on which there is a regular pattern which is periodic in two in-plane directions, comprising:
means for illuminating said pattern itself (and not a record thereof) by a single beam of coherent electromagnetic radiation;
receiving and combining means for receiving from the pattern at least three of a zero order beam and a plurality of diffracted beams, one beam intersecting the plane in which the other two beams lie, and for combining as at least two pairs said at least three beams whereby the combined beams interfere;
sensing means to sense the average wavelength of the spatial variation of the interference pattern in each combined beam; and
calculating means to calculate from the sensed average wavelengths at least one of the maximum principal in-plane stress or strain, the angle of the principal stress or strain, and the maximum shear stress or strain.

27. A method of sensing in-plane deformation of a surface on which there is a regular pattern which is periodic in two in-plane dimensions comprising deforming the surface so as to deform the pattern; illuminating the deformed pattern with a single beam of coherent electromagnetic radiation so that the radiation is reflected as one zero order beam and a plurality of diffracted beams; and combining at least three of said beams as at least two beam pairs, one beam intersecting the plane in which two other beams lie, whereby each pair interfers in a manner related to the deformation along the direction of the intersection of said plane of the surface with the plane in which each pair of interfering beams lie.

28. A method according to claim 27 in which the regular periodic pattern is a relief pattern.

29. A method according to claim 27 in which the pattern is periodic in two orthogonal directions, and two pairs of beams are combined, each pair of beams lying in one of two orthogonal planes.

30. A method according to claim 27 in which the pattern is periodic in two orthogonal directions, and three pairs of beams are combined, each pair defining a plane, with two of the planes being orthogonal and the third plane lying at 45° to each of the orthogonal planes, all three planes intersecting the deformed surface at right angles.

31. A strain measuring apparatus comprising:
means for illuminating a deformed pattern which is periodic in two in-plane dimensions by a single beam of coherent electromagnetic radiation;
receiving and combining means for receiving from said deformed pattern at least three of a zero order beam and a plurality of diffracted beams and for combining as at least two pairs of said at least three beams whereby the combined beams interefere; and
sensing means to sense the average wavelength of the spatial variation, transverse to each combined beam, of the interference pattern in the beams.

32. Strain measuring apparatus according to claim 31 in which the sensing means includes a linear array of photosensitive devices arranged transverse to each combined-beam and in the plane defined by the pair of beams before combination.

33. Strain measuring apparatus according to claim 31 in which the average wavelengths of the spatial variation of the interference patterns in each of two combined beams are each sensed by two linear arrays of photosensitive devices arranged transverse to each combined beam and at right angles to each other.

34. Strain measuring apparatus according to claim 31 in which the sensing means includes a two-dimensional photosensitive device arranged transverse to the combined-beams.

35. Strain measuring apparatus according to claim 31 comprising phase-modulation means arranged to cause a continuously varying phase relationship between the two beams in each combined beam whereby a moving interference pattern is produced; a pair of photosensitive devices arranged to receive each pattern, the devices being spaced apart by a distance which is small compared with the spatial wavelength of the interference pattern and in a direction such that the devices are separated in the plane in which the respective combined beams lie; and phase comparator means to sense the difference in phase of the output signals from each pair of photosensitive devices.

36. Strain measuring apparatus according to claim 35 in which the illuminating means further comprises polarising and modulating means arranged to provide an illuminating beam consisting of radiation at two orthogonal directions of polarisation, radiation polarised in one direction being modulated and radiation polarised in the other direction being unmodulated; and the receiving and combining means each including a polarising means arranged so that, in each of three beam pairs, a modulated component of one received beam is combined with an unmodulated component of the other received beam.

37. A strain measuring system for measuring in-plane deformation of a surface on which there is a regular pattern which is periodic in two in-plane directions, comprising:
means for illuminating said pattern by a beam of coherent electromagnetic radiation;
receiving and combining means for receiving from the pattern at least three of a zero order beam and a plurality of diffracted beams, one beam intersecting the plane in which the other two beams lie, and for combining as at least two pairs said at least three beams whereby the combined beams interfere;
sensing means to sense the average wavelength of the spatial variation of the interference pattern in each combined beam; and
calculating means to calculate from the sensed average wavelengths at least one of the maximum principal in-plane stress or strain, the angle of the principal stress or strain, and the maximum shear stress or strain.

* * * * *